March 13, 1956     R. J. HARKENRIDER     2,737,686
INJECTION UNIT FOR MOLDING MACHINES
Filed Nov. 18, 1952
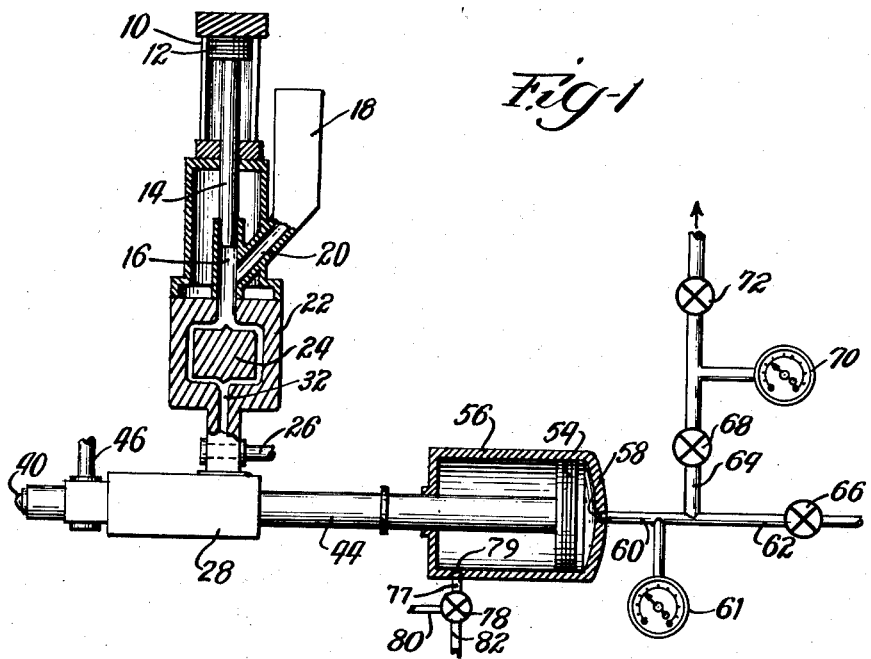
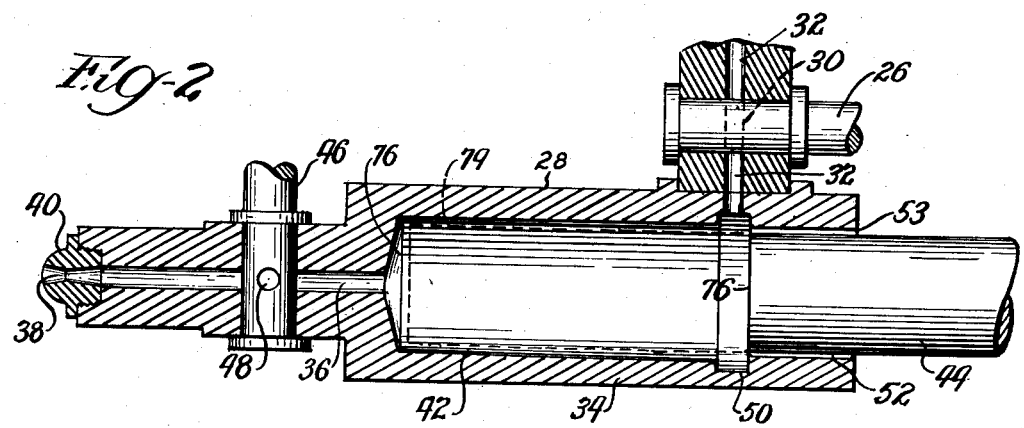
INVENTOR.
Robert J. Harkenrider
BY Mann, Brown and Hansmann
Attys United States Patent Office 2,737,686
Patented Mar. 13, 1956

2,737,686

INJECTION UNIT FOR MOLDING MACHINES

Robert J. Harkenrider, Winona, Minn., assignor, by mesne assignments, to Continental Can Company, Inc., New York, N. Y., a corporation of New York Application November 18, 1952, Serial No. 321,160

10 Claims. (Cl. 18—30)

This invention relates to injection molding machines and more particularly to an improved injection unit for molding machines adapted to inject pre-plasticized molding material from the injection cylinder into appropriate molds.

It has been generally known in the art of plastic molding to feed quantities of pellets of granular plastic molding material into the injection cylinder of a molding machine and to utilize the pressure of the injection ram acting against the injection orifice together with heat to reduce these pellets to a plastic or fluid state so that the molding material may be forced out of the injection orifice into appropriate molds. This procedure is objectionable in that tremendous injection pressures are required, a great amount of heat is required and the period of time required to complete an injection step or "shot" is relatively long.

In order to overcome these and other objections to the conventional method of injection molding, it has been determined that if molding material may be pasticized prior to being introduced into the injection chamber, the pressure required to force the molding material into the mold is considerably reduced, the time required for each molding ejection is shorter and the capacity of the machine per hour is increased. In addition, in using the pre-plasticized material, the number of die cavities for any operation may be increased and the resultant molded product is free of strains produced in conventional molding.

In pre-plasticizing molding material in the plasticizing chamber, it is known that gases are generated and these gases along with air become entrained in the plasticized molding material and, unless provision is made for the removal of these gases, they will be injected into the molds causing defects in the molded piece.

Another one of the difficulties involved in the use of pre-plasticizing methods with the injection cylinders now known is that there is a volume of air in the injection cylinder before the introduction of the pre-plasticized molding material, which air must be bled off in order to prevent it from becoming entrained in the plasticized molding material as it is being stuffed into the injection cylinder.

One of the objects of my invention is the provision of a molding machine having a pre-plasticizing chamber and an injection cylinder designed to reduce the amount of air and gas which may be entrained in the plasticized molding material.

Another object of my invention is to provide an injection cylinder, piston and valve arrangement which permits the escape of air and gas from the plasticized molding material.

Other objects and advantages of the invention will appear as the description is read in connection with the accompanying drawings in which:

Figure 1 is an elevation partly in section of the injection assembly of a molding machine;

Figure 2 is an enlarged longitudinal cross-sectional view of the injection cylinder, some parts being shown in elevation.

The injection assembly unit comprises a stuffer cylinder 10 of any conventional design within which a piston 12 reciprocates. Attached to the piston 12 is a ram 14 extending into a stuffer chamber 16. Adjacent the stuffer chamber is a hopper 18 adapted to feed granular molding material to the stuffer chamber through communicating channel 20. A plasticizing chamber 22 is in communication with stuffer chamber 20 and receives the granular molding material. Chamber 22 has appropriate heating elements and a spreader 24 and in this chamber the molding material is plasticized.

Between the plasticizing chamber 22 and the injection cylinder 28 is a rotary valve 26 having an orifice 30 (see Figure 2) adapted to be rotated from open position shown in Figure 2 wherein the plasticized material flows into the injection cylinder through channel 32, to closed position in which passage of the molding material between the plasticizing chamber and the injection cylinder is prevented. The injection cylinder 28 may be provided with one or more heating elements (not shown) to maintain the molding material in the injection cylinder in a plastic condition.

The injection cylinder 28 has a shell 34 forming on injection chamber, one end of which has a passage 36 therethrough and in communication with an opening 38 in an injection nozzle 40 which is removably secured in the shell 34. A bore 42 is provided in shell 34 within which bore an injection ram 44 is adapted to reciprocate. Between the bore 42 and the injection nozzle 40 is a rotary valve 46 having an opening 48 which is adapted by rotation to open and close communication between the injection nozzle 40 and bore 42 of the injection cylinder. Bore 42 is of a diameter larger than the diameter of the injection ram 44 thus providing a channel to permit the flow of plasticized material between the ram 44 and the cylinder wall (as will be hereinafter more fully explained) and in practice it has been found that a clearance between the side walls of the bore 42 and the ram 44 of from .070 to .150 inch is satisfactory.

Bore 42 may also be provided with an annular recess or pooling area 50 adjacent and in communication with opening 32 leading from the plasticizing chamber to the injection cylinder. The plasticizing chamber may be secured in open communication with the injection cylinder in any suitable manner.

Shell 34 of the injection cylinder has also a second bore 52 forming a continuation of the injection chamber and being of a diameter less than bore 42 and slightly larger than the diameter of the injection ram 44 to provide a clearance or opening 53. It has been found in practice that a clearance between bore 52 and the injection ram of approximately .003 to .010 inch is satisfactory. The space or clearance 53 beween bore 52 and ram 44 provides an escape to atmosphere.

The injection ram 44 is preferably of uniform diameter throughout the effective length in which it operates in the injection cylinder and is usually operated hydraulically by a piston 54 reciprocating in a cylinder 56. The hydraulic cylinder 56 is provided with an opening 58 at one end to receive a pipe 60 to furnish a supply and exhaust passage for hydraulic fluid under pressure.

Pipe 60 has a high pressure gauge 61 fitted therein and is connected to a conduit 62 which leads to a hydraulic pump (not shown) for supplying oil under pressure and is also connected to conduit 64 to permit the passage of the oil to an oil sump upon return of the piston after a compression stroke.

A quick opening valve 66 is interposed in conduit 62 between the oil pump and the cylinder 56 to open and close communication between the two. A quick opening valve 68 is interposed in conduit 64 to open and close communication between the cylinder 56 and the oil pump. In addition, conduit 64 is provided with a low pressure gauge 70 and an adjustable relief valve 72 adapted to be manually operated to control the rate at which the hydraulic fluid is permitted to escape to the oil sump.

The operation of this injection assembly unit is as follows:

Granular molding material is placed in hopper 18 from which it is fed by gravity through passage 20 into the stuffing chamber 16. Through appropriate controls, piston 12 is caused to reciprocate in cylinder 10, thereby reciprocating stuffer ram 14 which forces the granular material under pressure through the stuffing chamber into the plasticizing chamber 22. While this granular material is being forced through the plasticizing chamber, the spreader and heating elements located therein operate to reduce the granular material to a fluid or plastic state in which condition it is forced under pressure through valve 26 into the injection cylinder 28.

The operation of the injection ram 44 in the injection cycle is very rapid, and for purposes of explanation herein it is assumed that an injection stroke has just been completed and ram 44 is in advanced position shown in dotted lines 74. When in this position valve 46 is closed, valve 26 is open, valve 66 is closed, valve 68 is open and valve 72 is selectively partially open to accomplish the desired result hereinafter described. By continued operation of the stuffer ram 14, the plasticized material is forced from the plasticizing chamber into the injection cylinder and as it enters the injection cylinder, it encounters the material remaining from the previous injection stroke which fills the clearance between the ram 44 and the walls of the cylinder formed by the bores 42 and 52. By continued operation of the stuffer ram 14, the molding material is forced to flow along chamber 42 to act against the end 76 of the injection ram 44, forcing it to move rearwardly, the plastic material occupying the space from which the ram is moved. By continued operation of the stuffing ram 14, the injection ram 44 and the piston 54 to which it is attached are moved rearwardly to a position where the end 76 of the ram 44 is moved beyond the inlet passage for the molding material. The piston 54 is likewise moved rearwardly the maximum distance of its travel in cylinder 56. In this position the piston and injection ram are properly located for the next injection stroke.

It is necessary in a molding operation to prevent the hot molding material from remaining in the injection chamber long enough for it to become charred. Such charring takes place generally if the molding material remains in the injection chamber for more than two complete cycles. It is noted that in my construction the plastic molding material flows from the inlet through the clearance between ram 44 and the walls of the bore 42 in a direction toward the discharge opening and occupies the position of the ram as the ram is forced rearwardly. As the ram approaches its retracted position, the incoming molding material acts to wipe off any molding material tending to adhere to the end of the ram. In this construction the flow of the molding material is progressive and constant toward the discharge end of the injection cylinder and this flow prevents molding material from being "hung up" or charred in the injection chamber.

During this procedure wherein the plasticized molding material is fed into the injection cylinder, the rate of travel of the injection ram and consequently the pressure being applied against the end of the injection ram may be controlled by selective operation of the valve 72, the amount of pressure being observed on gauge 70.

It has been noted heretofore that gases are generated in the molding material during plasticizing and it is desirable to expel these gases from such material before actual molding takes place. The restricted opening 53 between bore 52 and ram 44 operates to permit the escape of these gases. This opening is in communication with the atmosphere and the forward end of this clearance is located adjacent the inlet channel in which the plasticized molding material enters the injection chamber.

As this molding material enters under a pressure sufficiently high to move the ram 44 rearwardly against a pressure head dictated by the position of the valve 72, the air and entrained gases and a small quantity of plastic escape through opening 53. The difference in viscosity between the gases and the plastic molding material will, when adequate pressure is maintained in the injection chamber during the stuffing operation, result in the forcing out of the gases through the restricted opening 53. It has been found in practice that these gases escape freely with only a relatively small amount of plastic being exuded from opening 53.

If adequate pressure by operation of control valve 72 is not maintained on the molding material, the entrained gases will not be forced out of opening 53. Alternatively, if the molding material in the injection chamber is subjected to a pressure in excess of that required, the amount of plastic escaping through opening 53 is excessive. The amount of pressure to which the molding material must be subjected by operation of control valve 72 to secure the maximum amount of gas escaping with a minimum amount of plastic leakage varies depending upon the viscosity of the plastic molding material being used. The operation of the valve 72 during the stuffing operation therefore directly affects the amount of gas and molding material escaping through opening 53. In addition, the compression of the molding material by the forward movement of the ram during an injection stroke further acts to force the gas out of the injection cylinder through opening 53.

When the ram and piston 54 are forced back by the molding material to the rearward position, as shown in Figure 1, valves 26 and 68 are closed, valve 46 is open and hydraulic fluid under pressure is admitted to the cylinder 56 by the opening of the valve 66. By virtue of hydraulic pressure acting against the piston 54, injection ram 44 is moved forwardly, forcing the plastic material relatively free from entrained gas and air through channel 36 and nozzle 40 into appropriate molds. In the usual injection molding machines, the complete molding cycle or "shot" is completed very quickly and for this reason the valves referred to herein, other than valve 72, are operated automatically.

The hydraulic cylinder 56 may also be provided with an additional opening 79 communicating through conduit 77 with a valve 78 which may be rotated in one position to open communication with conduit 80 leading to an oil sump, and in a second position, in communication with conduit 82 leading to a hydraulic pump, and in a third position in which conduit 77 is closed from both conduits 80 and 82. The purpose of this arrangement is that if it is desirable to return piston 54 from a forward position in cylinder 56 to the rearward position shown in Figure 1, other than through a stuffing operation, this may be accomplished by opening valve 78 to communication with the hydraulic pump to obtain a supply of hydraulic fluid under pressure to return the piston to the rear position. During the next injection stroke valve 78 is rotated to be in communication with conduit 80 leading to an oil sump. In the normal operation of the injection assembly apparatus, valve 78 is in a position such that conduit 77 is in closed communication with conduits 80 and 82.

It will thus be seen that I have provided an injection cylinder for use with molding machines wherein the injection ram is returned from a position where an injection stroke has been completed to a position for the next injection stroke hydraulically by means of the plasticized molding material. The problem of air accumulation in the injection cylinder is thus obviated.

It is also apparent that I have provided an injection cylinder with a clearance between the cylinder and the ram open to atmosphere which permits the escape of gases accumulated in the molding material during the pre-plasticizing operation. I have also achieved a structure in which the plasticized molding material may be forced into the injection cylinder under controlled pressures, permitting the controlled leakage of gas from the injection cylinder together with a small amount of the molding material.

I claim:

1. An injection assembly for molding machines comprising an injection chamber having a bore therein, an injection ram adapted to reciprocate in said bore, a channel between said ram and the walls of said bore through which plasticized molding material may flow when said ram is in a forward position in said bore, and means associated with said injection chamber for supplying plasticized molding material under pressure to said injection chamber through said channel to move said ram from its forward position in said bore to a rearward position.

2. An injection assembly for molding machines comprising an injection chamber having a bore therein, an injection ram adapted to reciprocate in said bore, a channel between said ram and the walls of said bore through which plasticized molding material may flow when said ram is in a forward position in said bore, means associated with said injection chamber for supplying to said chamber through said channel plasticized molding material under pressure to move said ram from its forward position in said bore to a rearward position, and means associated with said ram to control the pressure at which said plasticized molding material may be maintained in said chamber and the rate at which said ram may be moved rearwardly.

3. An injection assembly for molding machines comprising an injection chamber having a bore therein, an injection ram adapted to reciprocate in said bore, a channel between said ram and the walls of said bore through which plasticized molding material may flow when the ram is in a forward position in said bore, means including an inlet associated with said injection chamber for delivering a supply of plasticized molding material under pressure through said channel to the front face of said ram to move said ram from its forward position in said bore to a rearward position, a second bore in said chamber adjacent said inlet, said second bore being of a diameter less than said first bore but greater than the diameter of said ram to provide a second channel in communication with said first channel and said chamber, said second channel being on one side open to atmosphere to permit the escape of gas from said chamber, and means associated with said ram to control the pressure of said molding material in said injection chamber.

4. A molding machine injection assembly unit for use with a continuous source of plasticized molding material under pressure comprising an injection chamber having a bore therein and having a discharge opening at one end and an inlet passage adjacent the other end to admit said molding material to said chamber, an injection ram adapted to reciprocate in said bore, a channel between said ram and the walls of said bore when said ram is forward in said bore through which molding material under pressure may flow to return said ram from said forward position in said bore to retracted position, means forming a restricted opening in said chamber adjacent said inlet opening to permit escape of gas from said chamber, a piston and cylinder arrangement adapted to reciprocate said ram in said bore, fluid supply means to move said piston in said cylinder, conduit means to exhaust said fluid from said cylinder, and control means in said exhaust conduit means to selectively control the rate of exhaust of the fluid from said cylinder and the pressure of the molding material in said chamber.

5. A molding machine injection assembly unit for use with a continuous source of pre-plasticized molding material under pressure comprising an injection chamber having a two-diameter bore therein, said chamber having a discharge opening at one end and an opening adjacent the other end to admit said molding material under pressure, an injection ram, a piston and cylinder arrangement adapted to reciprocate said ram in said bore, fluid supply means to move said piston in said cylinder, conduit means to exhaust said fluid from said cylinder, the first diameter of said bore being larger than the ram diameter to provide a channel between said ram and the walls of said bore to permit the flow of said molding material through said channel and along said ram toward the discharge end of said chamber, the second diameter of said bore adjacent said inlet opening being smaller than said first bore diameter but larger than said ram diameter to provide a passage open to atmosphere between said ram and the walls of said second diameter bore for the escape of gas to atmosphere, and control means in said exhaust conduit means to maintain the molding material being admitted to said injection chamber under constant pressure.

6. An injection assembly for molding machines, comprising an injection chamber having a bore and a discharge opening therein, an injection ram adapted to reciprocate in said bore, said ram having a diameter less than said bore, a channel between said ram and the walls of said bore when said ram is in a forward position, said channel being formed by said diameter differential, and means associated with said chamber adjacent the rearward position of said ram in said chamber for supplying plasticized molding material under pressure to said discharge opening through said channel.

7. An injection assembly for molding machines comprising an injection chamber having a bore and a discharge opening therein, an injection ram adapted to reciprocate in said bore, said ram having a diameter less than said bore, a channel between said ram and the walls of said bore when said ram is in a forward position, said channel being formed by said diameter differential, means associated with said chamber adjacent the rearward position of said ram in said chamber for supplying plasticized molding material under pressure to said discharge opening through said channel, and means adjacent the rearward position of said ram in said bore forming a passage in communication with said channel on one side and atmosphere on the other side to permit the escape of gas from said molding material.

8. An injection assembly for molding machines, as set forth in claim 1, in which said last named means includes an inlet port for said chamber located rearwardly of the most forward position of the ram.

9. An injection assembly for molding machines, as set forth in claim 1, in which said last named means includes an inlet port located adjacent to but forward of the position of the ram immediately prior to its injection stroke.

10. An injection assembly for molding machines, as set forth in claim 1, in which said last named means includes an inlet port for said chamber located rearwardly of the most forward position of the ram, and in which the inlet port includes an enlarged annular pooling area in communication with said channel for uniformly introducing said plasticized molding material into said channel.

References Cited in the file of this patent

UNITED STATES PATENTS

| | | |
|---|---|---|
| 2,302,872 | Lester | Nov. 24, 1942 |
| 2,318,031 | Tucker | May 4, 1943 |
| 2,493,805 | Dinzl | Jan. 10, 1950 |